(12) United States Patent
Asadi et al.

(10) Patent No.: US 11,878,706 B2
(45) Date of Patent: Jan. 23, 2024

(54) DRIVER COMMAND PREDICTION

(71) Applicant: GM GLOBAL TECHNOLOGY OPERATIONS LLC, Detroit, MI (US)

(72) Inventors: Ehsan Asadi, North York (CA); Seyedeh Asal Nahidi, North York (CA); SeyedAlireza Kasaiezadeh Mahabadi, Novi, MI (US); Kausalya Singuru, Troy, MI (US); Bakhtiar B. Litkouhi, Washington, MI (US); Isaac Tabatschnic, Richmond Hill (CA)

(73) Assignee: GM Global Technology Operations LLC, Detroit, MI (US)

( * ) Notice: Subject to any disclaimer, the term of this patent is extended or adjusted under 35 U.S.C. 154(b) by 174 days.

(21) Appl. No.: 17/406,729

(22) Filed: Aug. 19, 2021

(65) Prior Publication Data
US 2023/0055066 A1    Feb. 23, 2023

(51) Int. Cl.
| | |
|---|---|
| *B60W 50/10* | (2012.01) |
| *G05B 13/02* | (2006.01) |
| *B60W 50/06* | (2006.01) |
| *B60W 40/06* | (2012.01) |
| *B60W 50/00* | (2006.01) |

(52) U.S. Cl.
CPC ............ *B60W 50/10* (2013.01); *B60W 40/06* (2013.01); *B60W 50/0097* (2013.01); *B60W 50/06* (2013.01); *G05B 13/027* (2013.01)

(58) Field of Classification Search
CPC .. B60W 50/10; B60W 40/06; B60W 50/0097; B60W 50/06; B60W 2050/0029; B60W 2050/0088; G05B 13/027
See application file for complete search history.

(56) References Cited

U.S. PATENT DOCUMENTS

| | | | |
|---|---|---|---|
| 10,589,739 B2 | 3/2020 | Kasaiezadeh Mahabadi et al. | |
| 2019/0378041 A1* | 12/2019 | Dhansri | G06N 7/01 |
| 2020/0172117 A1* | 6/2020 | Zhu | B60W 50/00 |
| 2020/0174486 A1* | 6/2020 | Luo | G05D 1/0088 |
| 2020/0216085 A1* | 7/2020 | Bobier-Tiu | B60W 40/08 |
| 2020/0216090 A1* | 7/2020 | Zaseck | B60W 30/0953 |
| 2021/0094561 A1* | 4/2021 | Jiang | B60W 10/18 |
| 2021/0200229 A1* | 7/2021 | Refaat | B60W 60/0027 |
| 2021/0253128 A1* | 8/2021 | Nister | G06N 5/01 |
| 2022/0035375 A1* | 2/2022 | Rezaee | G05B 13/027 |

(Continued)

*Primary Examiner* — Sze-Hon Kong
(74) *Attorney, Agent, or Firm* — Quinn IP Law (57) ABSTRACT

A driver command predictor includes a controller, multiple sensors, and a command prediction unit. The controller is configured to command an adjustment of multiple motion vectors of a vehicle relative to a roadway in response to multiple actual driver commands and multiple future driver commands. The actual driver commands are received at a current time. The future driver commands are received at multiple update times. The update times range from the current time to a future time. The sensors are configured to generate sensor data that determines multiple actual states of the vehicle in response to the motion vectors as commanded. The command prediction unit is configured to generate the future driver commands at the update times in response to a driver model. The driver model operates on the actual driver commands and the actual states to predict the future driver commands at the update times.

20 Claims, 7 Drawing Sheets

(56) References Cited

U.S. PATENT DOCUMENTS

| | | | |
|---|---|---|---|
| 2022/0242422 A1* | 8/2022 | Thompson | B60W 50/0097 |
| 2022/0242441 A1* | 8/2022 | Thompson | G06V 10/774 |
| 2022/0297728 A1* | 9/2022 | Varadarajan | G06V 10/82 |

* cited by examiner

DRIVER COMMAND PREDICTION

INTRODUCTION

The present disclosure relates to a system and a method for driver command prediction.

In developing model predictive controllers for vehicle motion control, states of the vehicle are predicted over a finite horizon with an assumption that driver input commands remain constant over the finite horizon. The assumption may not be accurate as drivers sometimes react to dynamic road conditions. Therefore, the assumption can lead to sub-optimum predictive control actions.

What is desired is a technique for driver command prediction.

SUMMARY

A driver command predictor is provided herein. The driver command predictor includes a controller, a plurality of sensors, and a command prediction unit. The controller is configured to command an adjustment of one or more motion vectors of a vehicle relative to a roadway in response to a plurality of actual driver commands and a plurality of future driver commands. The plurality of actual driver commands are received at a current time. The plurality of future driver commands are received at a plurality of update times. The plurality of update times range from the current time to a future time. The plurality of sensors is configured to generate a plurality of sensor data that determines a plurality of actual states of the vehicle in response to the one or more motion vectors as commanded. The command prediction unit is configured to generate the plurality of future driver commands at the plurality of update times in response to a driver model. The driver model operates on the plurality of actual driver commands and the plurality of actual states to predict the plurality of future driver commands at the plurality of update times.

In one or more embodiments, the driver command predictor includes one or more information devices configured to generate road information. The driver model operates on the road information to generate the plurality of future driver commands at the plurality of update times.

In one or more embodiments of the driver command predictor, the driver model is a deep learning model.

In one or more embodiments of the driver command predictor, the deep learning model is configured to generate a plurality of desired states of the vehicle based on the plurality of actual driver commands and a plurality of vehicle dynamic properties.

In one or more embodiments of the driver command predictor, the command prediction unit generates the plurality of future driver commands to conform the plurality of desired states to the plurality of actual states.

In one or more embodiments of the driver command predictor, the command prediction unit is configured to generate a plurality of results by a comparison of the plurality of future driver commands to the plurality of actual driver commands, and update the driver model based on the plurality of results.

In one or more embodiments of the driver command predictor, the controller treats the plurality of actual driver commands as a plurality of constants between the current time and the future time.

In one or more embodiments of the driver command predictor, the controller includes a driver command interpreter configured to generate a plurality of intermediate commands in response to the plurality of actual driver commands and the plurality of future driver commands, and a model predictive controller that commands the adjustment of the one or more motion vectors of the vehicle at the plurality of update times in response to the plurality of intermediate commands and the plurality of future driver commands.

In one or more embodiments of the driver command predictor, the future time is in a range of 100 milliseconds to 500 milliseconds after the current time.

A method for driver command prediction is provided herein. The method includes commanding an adjustment of one or more motion vectors of a vehicle relative to a roadway in response to a plurality of actual driver commands and a plurality of future driver commands. The plurality of actual driver commands are received by a circuit at a current time. The method further includes generating a plurality of sensor data that determines a plurality of actual states of the vehicle in response to the one or more motion vectors as commanded, and generating the plurality of future driver commands at a plurality of update times in response to a driver model. The plurality of update times range from the current time to a future time. The driver model operates on the plurality of actual driver commands and the plurality of actual states to predict the plurality of future driver commands at the plurality of update times.

In one or more embodiments, the method includes generating road information. The driver model operates on the road information to generate the plurality of future driver commands at the plurality of update times.

In one or more embodiments of the method, the driver model is a deep learning model.

In one or more embodiments of the method, the deep learning model is configured to generate a plurality of desired states of the vehicle based on the plurality of actual driver commands and a plurality of vehicle dynamic properties.

In one or more embodiments of the method, the plurality of future driver commands are generated to conform the plurality of desired states to the plurality of actual states.

In one or more embodiments, the method includes generating a plurality of results by a comparison of the plurality of future driver commands to the plurality of actual driver commands, and updating the driver model based on the plurality of results.

In one or more embodiments of the method, the plurality of actual driver commands are treated as a plurality of constants between the current time and the future time.

A vehicle is provided herein. The vehicle includes a plurality of driver control and a driver command predictor. The plurality of driver controls is configured to generate a plurality of actual driver commands. The driver command predictor is configured to command an adjustment of one or more motion vectors of the vehicle relative to a roadway in response to the plurality of actual driver commands and a plurality of future driver commands. The plurality of actual driver commands are received at a current time. The driver command predictor is further configured to generate a plurality of sensor data that determines a plurality of actual states of the vehicle in response to the one or more motion vectors as commanded, and generate the plurality of future driver commands at a plurality of update times in response to a driver model. The plurality of update times range from the current time to a future time. The driver model operates on the plurality of actual driver commands and the plurality of actual states to predict the plurality of future driver commands at the plurality of update times.

In one or more embodiments of the vehicle, the driver command predictor includes one or more information devices configured to generate road information, wherein the driver model operates on the road information to generate the plurality of future driver commands at the plurality of update times.

In one or more embodiments of the vehicle, the driver model is a deep learning model, and the deep learning model is configured to generate a plurality of desired states of the vehicle based on the plurality of actual driver commands and a plurality of vehicle dynamic properties.

In one or more embodiments of the vehicle, the driver command predictor generates the plurality of future driver commands to conform the plurality of desired states to the plurality of actual states.

The above features and advantages and other features and advantages of the present disclosure are readily apparent from the following detailed description of the best modes for carrying out the disclosure when taken in connection with the accompanying drawings.

DETAILED DESCRIPTION

Embodiments of the present disclosure generally provide a structure and/or a technique to predict short-term driver commands for an enhancement of vehicle predictive control. The structure and technique predict the driver short-term commands during each of multiple sampling times over a prediction horizon. The predictions may be based on current vehicle states, previous vehicle states, driver commands, road information, and/or available sensory information on the vehicle. The sensory information generally includes vision information, map information, radar information, and the like. The predicted driver commands are subsequently used to calculate enhancements for vehicle motion predictive controls. The vehicle motion predictive controls are reformulated to incorporate the predicted driver commands to achieve a desired vector motion, in particular, lateral motion and yaw motion to support a maximum lateral grip of the vehicle.

Figure 1:
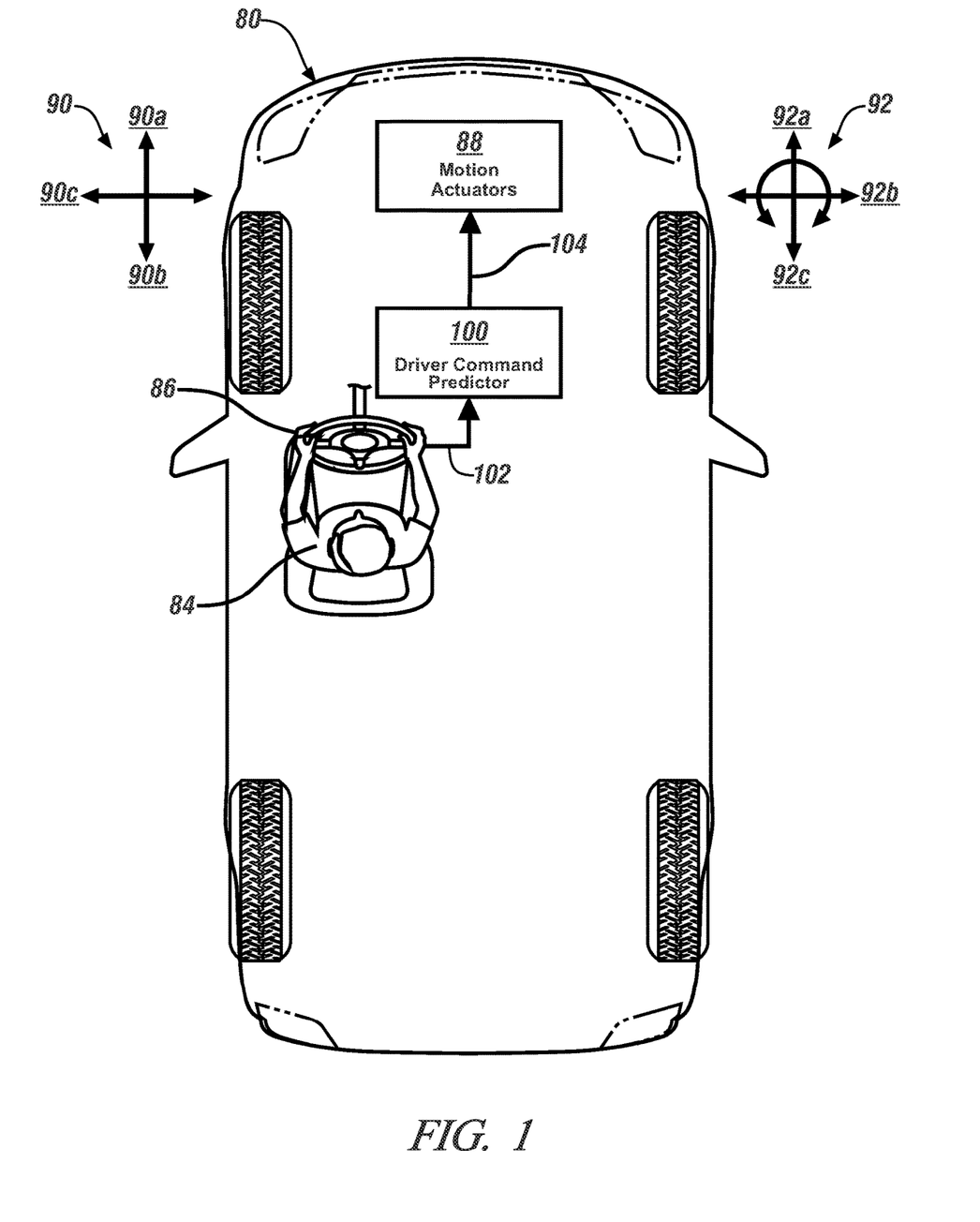
FIG. 1 is a schematic diagram illustrating a context of a vehicle in accordance with one or more exemplary embodiments.

Referring to FIG. 1, a schematic diagram illustrating a context of a vehicle 80 is shown in accordance with one or more exemplary embodiments. The vehicle 80 moves on a roadway 82. The vehicle 80 includes multiple driver controls 86, motion actuators 88, and a driver command predictor 100. The vehicle 80 may be occupied by a driver 84. The driver 84 is disposed in a cabin of the vehicle 80.

Actual driver command signals 102 may be generated by the driver 84 using the driver controls 86. The actual driver command signals 102 are received by the driver command predictor 100. The actual driver command signals 102 include at least a steering component, an acceleration component, a braking component, and a gear select component. Predictive motion command signals 104 are generated by the driver command predictor 100 and transferred to the motion actuators 88. The predictive motion command signals 104 convey at least steering commands, acceleration commands, braking commands, and gear selection commands to the motion actuators 88.

The vehicle 80 implements as an automobile (or car). In various embodiments, the vehicle 80 may include, but is not limited to, a passenger vehicle, a truck, an autonomous vehicle, a gas-powered vehicle, an electric-powered vehicle, a hybrid vehicle and/or a motorcycle. Other types of vehicles 80 may be implemented to meet the design criteria of a particular application.

The vehicle 80 has vehicle dynamic properties 90. The vehicle dynamic properties 90 include acceleration property 90a, a braking property 90b, and a steering property 90c. The vehicle 80 motion relative to the roadway 82 may be described as on one or more motion vectors 92. The motion vectors 92 include a longitudinal vector 92a, a lateral vector 92b, and yaw vector 92c.

The driver 84 is a user of the vehicle 80. The driver 84 manually controls a variety of functions in the vehicle 80. In various embodiments, the driver 84 may control the steering, the acceleration, the braking, and the gear selection by entering manual commands into the driver controls 86.

The driver controls 86 implement multiple devices mounted inside the vehicle 80 and used by the driver 84. The driver controls 86 are operational to provide input sensors and output indicators to the driver 84. The driver controls 86 may include a steering wheel, an accelerator pedal, a brake pedal, a gear shift select, a speedometer, a gear select indicator, a compass heading, and the like. Other driver controls 86 may be implemented to meet the design criteria of a particular application.

The motion actuators 88 implement multiple electromechanical devices. The motion actuators 88 are operational to cause changes in the motion and orientation (or direction) of the vehicle 80 in response to the predictive motion command signals 104.

The driver command predictor 100 implements an adaptive predictive controller. The driver command predictor 100 is operational to command changes to the motion of the vehicle 80 over a finite prediction/control horizon in time.

The finite horizon may be in a range of approximately several dozen milliseconds (ms) (e.g., 100 ms) to several hundreds of millisecond (e.g., 500 ms). In various embodiments, the finite horizon may be 250 ms. Other durations may be implemented to meet a design criteria of a particular application.

The driver command predictor 100 commands the motion actuators 88 to adjust one or more motion vectors 92 of the vehicle 80 relative to the roadway 82 in response to the actual driver command signals 102 and multiple future driver commands. The actual driver commands are received at a current time in the actual driver command signals 102. The future driver commands are generated internal to the driver command predictor 100 at multiple updated times in response to a driver model. The driver command predictor 100 also generates sensor data that determines multiple actual states of the vehicle 80 in response to the one or more motion vectors 92 as commanded. The update times are between the current time and a future time. The driver model operates on the actual driver commands and the actual states of the vehicle 80 to predict the future driver commands at the update times.

Figure 2:
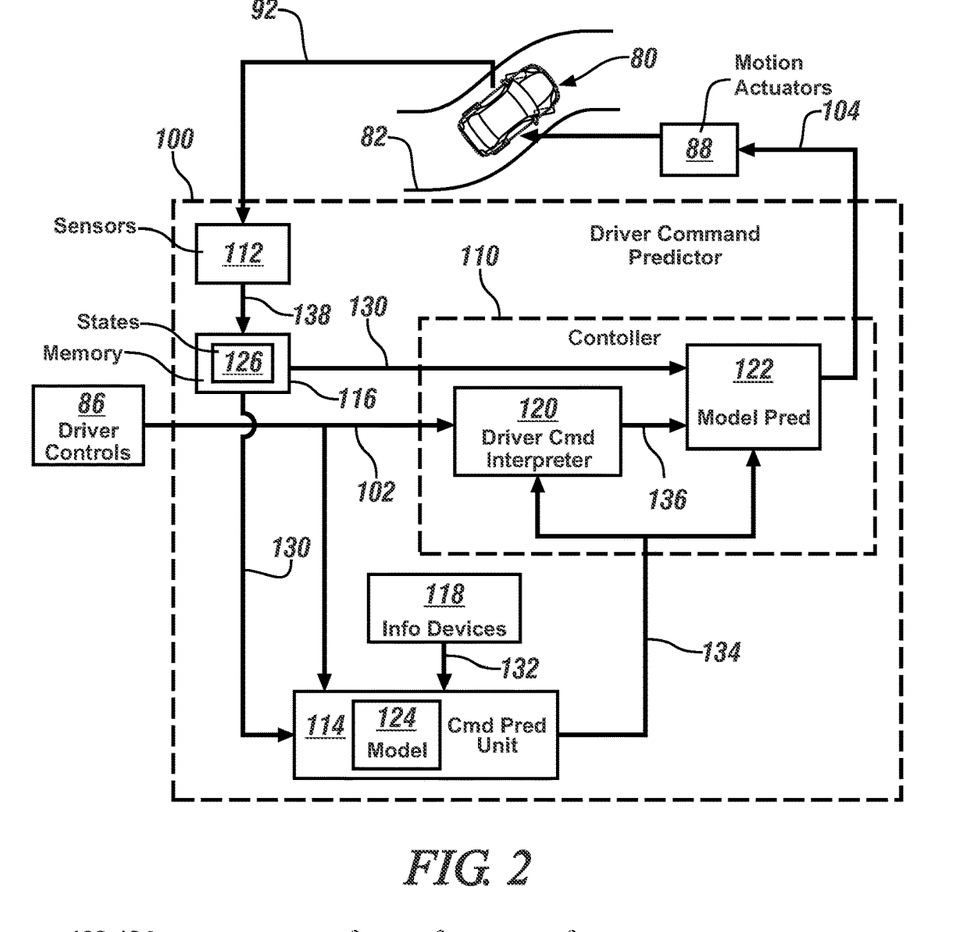
FIG. 2 is a schematic diagram of a driver command predictor in accordance with one or more exemplary embodiments.

Referring to FIG. 2, a schematic diagram of an example implementation of the driver command predictor 100 is shown in accordance with one or more exemplary embodiments. The driver command predictor 100 generally includes a controller 110, multiple sensors 112, a command prediction unit 114, a memory 116, and one or more information devices 118. The controller 110 includes a driver command interpreter 120 and a model predictive controller 122. The command prediction unit 114 includes a driver model 124. The memory 116 is operational to store multiple vehicle states 126.

The motion vectors 92 of the vehicle 80 are sensed by the sensors 112. The actual driver command signals 102 are received from the driver controls 86 by the command prediction unit 114 and the driver command interpreter 120. The predictive motion command signals 104 are generated and presented to the motion actuators 88 by the model predictive controller 122.

A vehicle states signal 130 is generated by the memory 116 and presented to the command prediction unit 114 and the model predictive controller 122. The vehicle state signal 130 carries the vehicle states 126 (current states and past states). A road information signal 132 is generated by the information devices 118 and received by the command prediction unit 114. The road information signal 132 conveys information gathered by the information devices 118 about the roadway 82 and the environment around the vehicle 80. The environment may include other vehicles, obstacles, weather, pedestrians, and the like.

A future driver command signal 134 is generated by the command prediction unit 114 and presented to the driver command interpreter 120 and the model predictive controller 122 in the controller 110. The future driver command signal 134 transfers predicted future driver commands to the controller 110. An intermediate command signal 136 is generated by the driver command interpreter 120 and presented to the model predictive controller 122. The intermediate command signal 136 carries sampled driver commands that are held constant over the finite horizon. A sensor signal 138 is generated by the sensor 112 and received by the memory 116. The sensor signal 138 carries the sensor data created by the sensors 112.

The controller 110 implements a prediction circuit. The controller 110 is operational to predict the driver command slightly into the future (e.g., 100 ms to 500 ms) and utilize the predictions to cause changes in the motion actuators 88. The changes requested to the motion actuators 88 cause changes to the motion vectors 92 of the vehicle 80 that take into account the vehicle dynamic properties 90.

The sensors 112 implement multiple electro-mechanical sensors. The sensors 112 are operational to convert changes in the physical motion of the vehicle 80 into the sensor data within the sensor signal 138. The sensor data is processed and stored in the memory 116 as the vehicle states 126. The sensors 112 may include, but are not limited to, acceleration sensors and internal motion sensors.

The command prediction unit 114 implements a short-term prediction technique. The command prediction unit 114 utilizes the vehicle states 126, the actual driver commands, and the road information (past and current) to predict future driver commands over the finite horizon. The predicted driver commands are presented in the future driver command signal 134 to the controller 110.

The memory 116 implements a data storage device. The memory 116 is operational to store the vehicle states 126 as derived from the sensor data, and present the vehicle states 126 in the vehicle states signal 130. In various embodiments, the memory 116 may include nonvolatile memory and/or volatile memory.

The driver command interpreter 120 relies on the vehicle states 126, the current driver commands, and the future driver commands to determine lateral motion and yaw motion of the vehicle 80 over the prediction/control horizon. By accounting for the future predicted driver commands, the driver command interpreter 120 calculates more accurate lateral motion and yaw motion control for the prediction/control horizon. The driver command interpreter 120 may assume that the current driver commands remain constant (e.g., not changing) within the prediction/control horizon.

The model predictive controller 122 is operational to generate the predictive motion command signal 104 based on the future driver command signal 134, the intermediate command signal 136, and the vehicle states 126. Incorporation of the future predicted driver commands enables the model predictive controller 122 to accurately control the motion of the vehicle 80 since driver commands variations are taken into account.

The driver model 124 implements a deep learning model. The driver model 124 models the estimated behavior of the driver 84. In various embodiments, the driver model 124 is a neural network model. In other embodiments, the driver model 124 is a recursive model.

Figure 3:
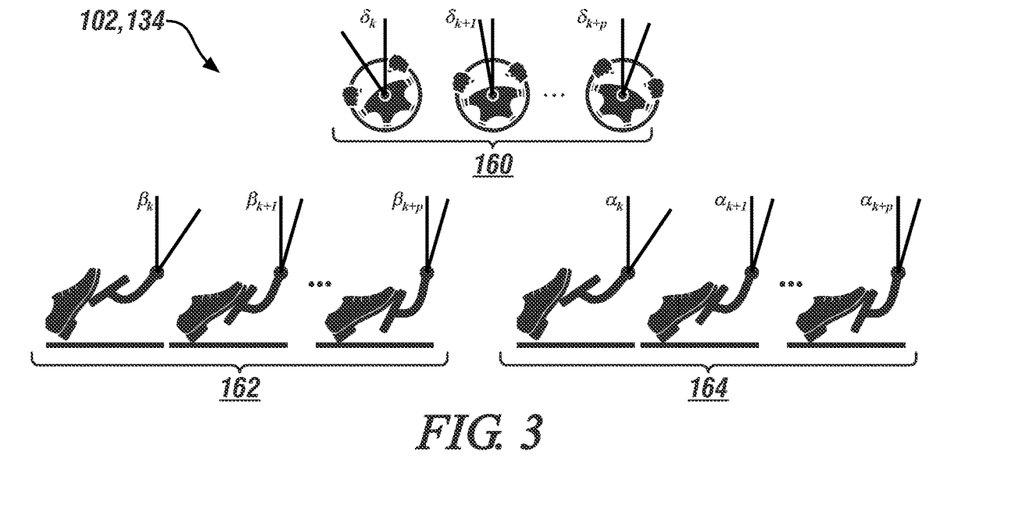
FIG. 3 is a schematic diagram of example driver commands in accordance with one or more exemplary embodiments.

Referring to FIG. 3, a schematic diagram of example driver commands is shown in accordance with one or more exemplary embodiments. The driver commands may include actual driver commands and sequences of predicted driver commands. The drive commands include at least a sequence of future steering commands 160, a sequence of breaking commands 162, and a sequence of acceleration commands 164.

The actual driver commands may be generated by the driver controls 86 and transferred to the controller 110 and the command prediction unit 114 in the actual driver command signals 102. The actual driver commands may include at least a current steering command $\delta_K$, a current braking command $\beta_K$, and a current acceleration command $\alpha_K$ as received at a current time K. Other current driver command may be implemented to meet a design criteria of a particular application.

The predicted driver commands may by generated by the command prediction unit 114 and presented in the future driver command signal 134 to the controller 110. The predicted driver commands may include at least a sequence of future steering commands $\delta_{K+1}$ to $\delta_{K+P}$, a sequence of future acceleration commands $\alpha_{K+1}$ to $\alpha_{K+P}$, and a sequence of future braking commands $\beta_{K+1}$ to $\beta_{K+P}$ at update times K, K+1, . . . , K+P. The finite horizon may range from the current time K to the future time K+P. By utilizing both the current commands $\delta_K$, $\beta_K$, and $\alpha_K$, the controller 110 provides enhanced control performance. Other predicted driver commands may be implemented to meet the design criteria of a particular application.

Figure 4:
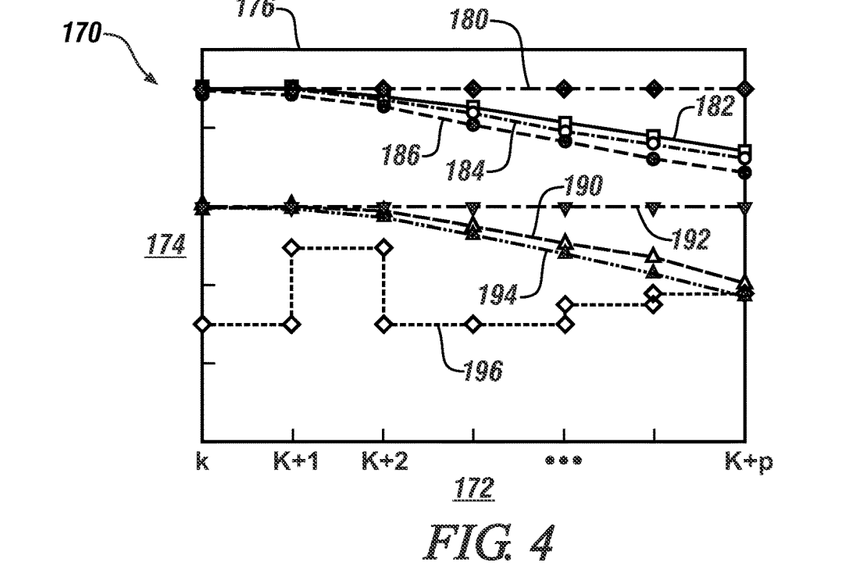
FIG. 4 is a graph of the example driver commands over a finite horizon in accordance with one or more exemplary embodiments.

Referring to FIG. 4, a graph 170 of an example finite horizon is shown in accordance with one or more exemplary embodiments. The graph 170 includes a first axis 172 and a second axis 174. The first axis 172 is illustrated in units of time spanning a prediction period 176 from the current time K to the future time K+P. The second axis 174 illustrates amplitudes of various signals.

A curve 180 is a constant curve illustrating what the driver command predictor 100 determines that the driver 84 wants to happen in the absence of the command prediction unit 114. The curve 180 illustrates an assumed constant command input from the driver 84.

A curve 182 is a reference curve illustrating what the driver command predictor 100 determines that the driver 84 wants to happen while taking the command prediction unit 114 into account. A curve 184 illustrates the predicted output of the driver command predictor 100. A curve 186 illustrates the actual response of the vehicle 80 based on the predicted output in the curve 184.

A curve 190 is an example of a sequence of actual driver commands. Treating the current driver commands as constants is shown in a curve 192. A curve 194 illustrates the predicted driver commands generated by the command prediction unit 114. A curve 196 illustrates the predicted control input generated by the command prediction unit 114 and utilized by the controller 110.

In situations that treat the actual driver commands as constants (the constant curve 180), a first error 200 may exist between the curve 180 and the actual output curve 186. In situations that include the command prediction unit 114 to estimate the driver commands at several points in time into the future, a second error 202 may exist between the predicted output curve 184 and the actual output curve 186. In the example, predicting and utilizing the future driver commands results in a smaller second error 202 compared with the first error 200.

Figure 5:
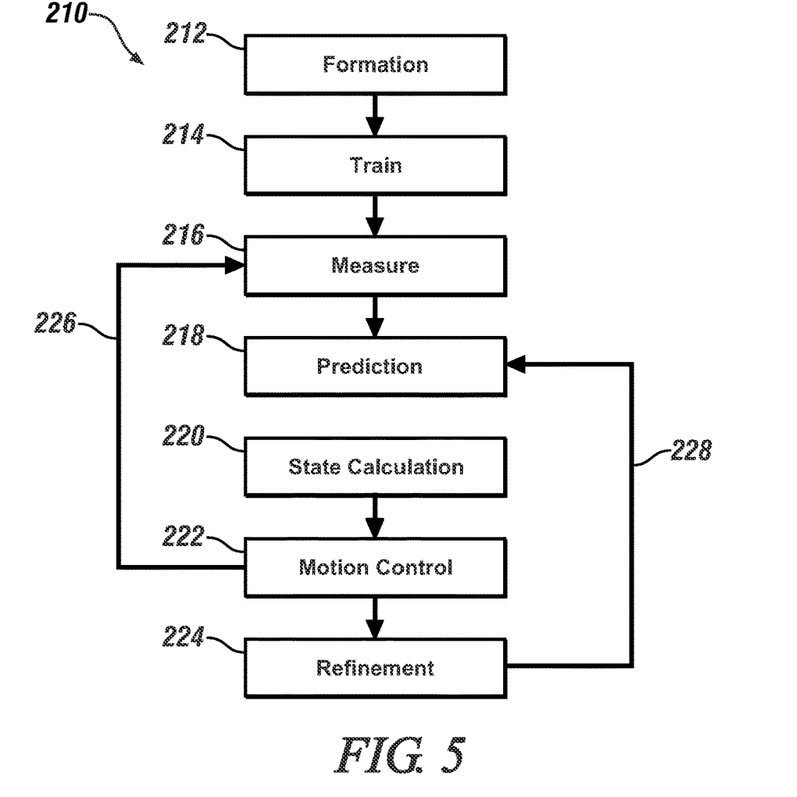
FIG. 5 is a flow diagram of a method for driver command prediction in accordance with one or more exemplary embodiments.

Referring to FIG. 5, a flow diagram of an example implementation of a method 210 for driver command prediction is shown in accordance with one or more exemplary embodiments. The method (or process) 210 is implemented by the driver command predictor 100 and an off-vehicle computer. The method 210 includes steps 212 to 224, as shown, with a real-time feedback path 226 and an update feedback path 228. The sequence of steps is shown as a representative example. Other step orders may be implemented to meet the criteria of a particular application.

The vehicle 80 may be considered as a system that responses as a function of inherent dynamics and the driver commands. The vehicle handling performance is enhanced by the motion actuators 88 assisting the driver 84. Vehicle motion control is constrained to the capabilities of the motion actuators 88 and the tires.

The model predictive controller 122 provides a real time, optimal, constrained solution at multiple operating points. The driver model 124 assists with foreseeing the driver steering and pedal commands, and allows time varying input estimations to model within the prediction/control horizon.

As the driver command predictor 100 implements a feedback control technique, the driver predicted inputs may also be utilized to recalculate state variables using governing vehicle dynamics equations. Furthermore, an accurate manipulated predictions are provided that are further aligned with the calculated driver intent.

In the method 210, formation activities may be performed in the step 212 to gather data used to train the driver model 124. The formation activities may be performed off-line and external to the vehicle 80. The driver model 124 is trained in the step 214. The training generally involves a deep learning model that is tuned based on the behavior of the driver 84 using the actual driver controls.

With the vehicle 80 in motion, the sensor data is measured by the sensor 112 in the step 216 to determine the vehicle states 126. Driver short-term command prediction is performed by the driver command predictor 100 in the step 218. The predictions are determined over the prediction horizon in real time. In the step 220, desired state calculations are performed based on the driver predicted commands.

Predictive motion control calculations are performed in the step 222. A goal of the calculations is to minimize an error between the actual states of the vehicle 80 and the desired states of the vehicle 80. The resulting error may be fed back to the sensor measurement step 216 along the real-time feedback path 226. Adaptation and refinement of the driver model 124 may be performed in the step 224. The refined driver model 124 may be used in the step 218 to improve the driver command predictions per the update feedback path 228.

Figure 6:
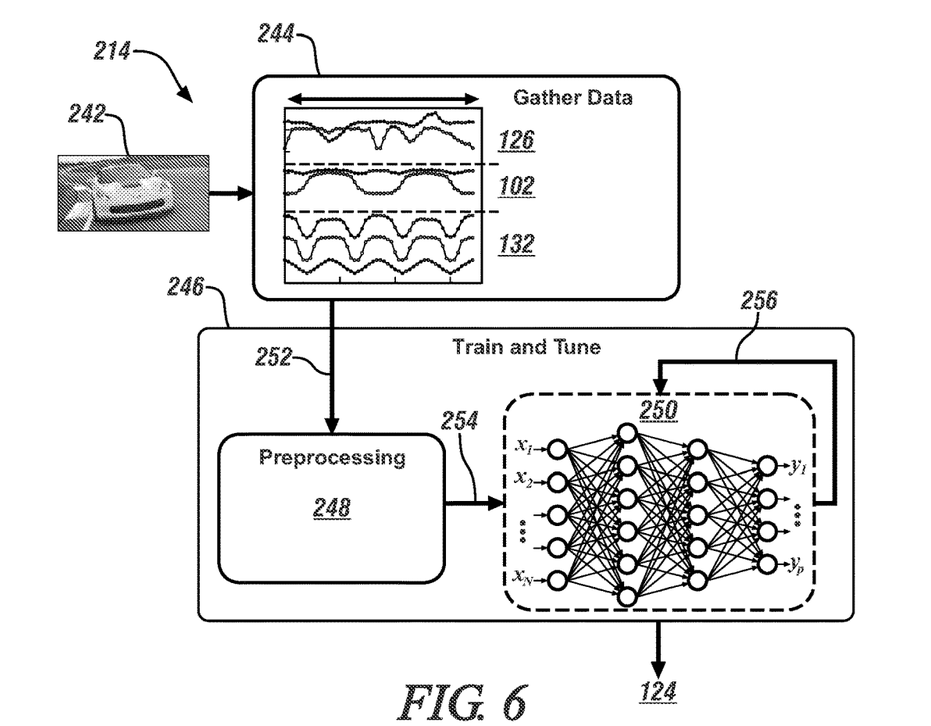
FIG. 6 is a flow diagram for a driver model training method in accordance with one or more exemplary embodiments.

Referring to FIG. 6, a flow diagram of an example implementation of the driver model training step 214 is shown in accordance with one or more exemplary embodiments. The step 214 includes steps 242 to 250, as shown. The sequence of steps is shown as a representative example. Other step orders may be implemented to meet the criteria of a particular application.

In the step 242, data collection may be performed to gather data related to the behavior of the driver 84. The data may be gathered over a suitable time frame in the step 244 to generate a large data set. The data may include, but is not limited to, the vehicle states 126, the actual driver command signals 102 and the road information signals 132. In the step 246, the driver model 124 is trained and finely tuned. The training involves preprocessing in the step 248 and fine tuning in the step 250.

Data for the preprocessing step 248 may be provided via the data set 252 gathered in the step 244. The preprocessing step 248 involves feature generation, missing data treatment, outlier data treatment, and the like. The preprocessing step 248 generates processed data 254 that is used to fine tune the driver model 124. In the step 250, the driver model 124 is updated using the processed data 254. One or more iterations 256 of the fine tuning may be performed. The resulting finely-tuned driver model 124 is ready for use in the vehicle 80 after the final iteration 256 has completed.

Figure 7:
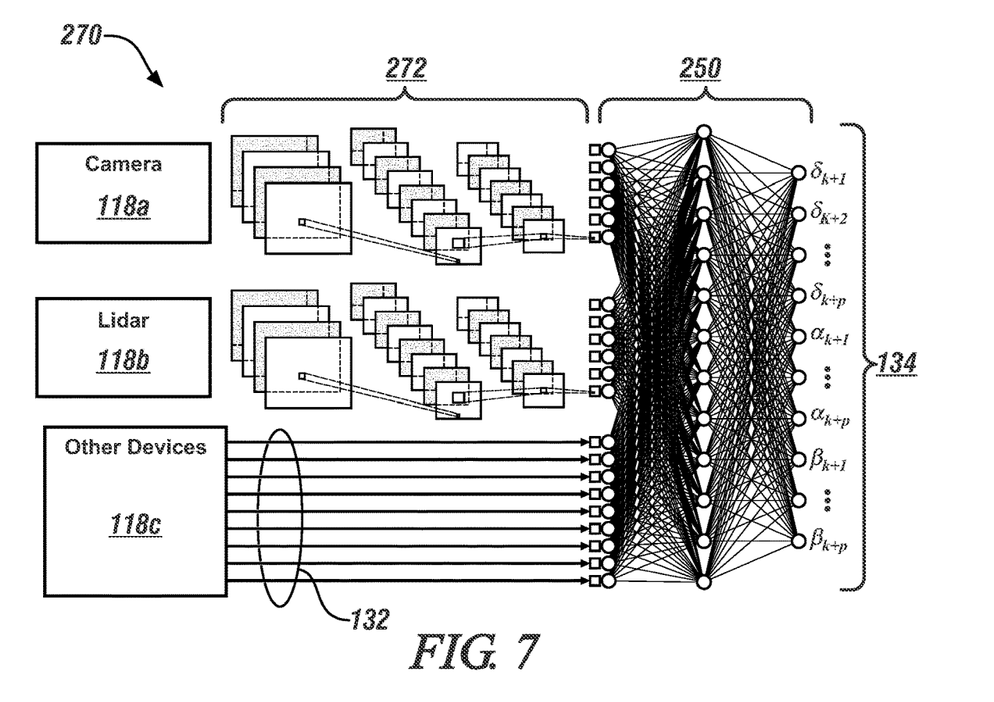
FIG. 7 is a flow diagram of a learning technique for the driver model in accordance with one or more exemplary embodiments

Referring to FIG. 7, a flow diagram of an example implementation of a learning technique 270 for the driver model 124 is shown in accordance with one or more exemplary embodiments. In the example, the learning technique 270 generally receives data from the information device 118 (e.g., a camera 118a, a lidar 118b, and other devices 118c). The other devices may include a map device, an inertial measurement unit, an electronic power steering torque sensor, wheel sensors, steering wheel sensors, suspension height sensors, a Global Positioning System, a throttle sensor, a brake pedal sensor, radars, accelerometers, and/or other estimated signals derived from the various sensors.

The learning technique 270 may perform one or more convolutions 272 of spatial data received from the camera 118a and the lidar 118b. The fine tuning step 250 may be used on the convoluted data and the data received from the other devices 118c to establish a recurrent and fully connected driver model 124.

Figure 8:
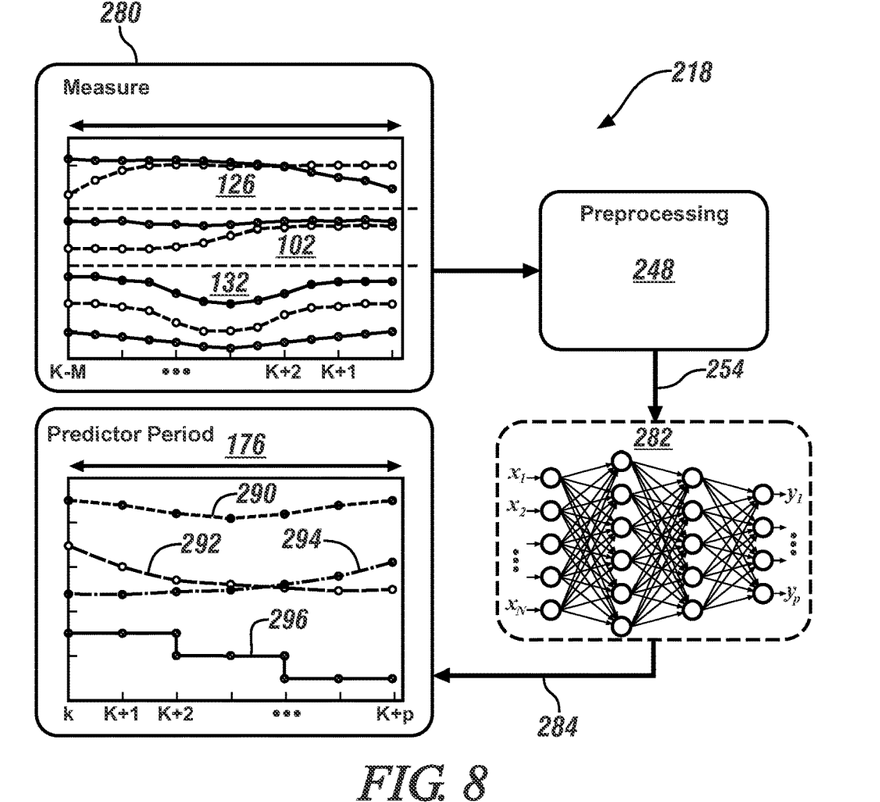
FIG. 8 is a flow diagram for a drive command prediction method in accordance with one or more exemplary embodiments.

Referring to FIG. 8, a flow diagram of an example implementation of the drive command prediction step 218 is shown in accordance with one or more exemplary embodiments. The step 218 includes steps 280 and 282.

In the step 280, the data from the driver controls 86, the sensors 112 and the information devices 118 is measured. In the example, the data includes the actual driver commands 102, the road information 132, and the sensor data. The sensor data determines the vehicle states 126.

The preprocessing step 248 is performed to determine features, handle missing sensor data point, handle outlier data, and the like. The processed data 254 is subsequently presented to the command prediction unit 114. In the step 282 driver model 124 in the command prediction unit 114 generates predicted driver command results 284. The predicted driver command results 284 include the future steering commands (e.g., a curve 290), future throttle commands (e.g., a curve 292), future braking command (e.g., a curve 294), future gear command (e.g., a curve 296), and the like. The predicted driver command results 284 may span the prediction period 176 (e.g., K to K+P) in real time.

Figure 9:
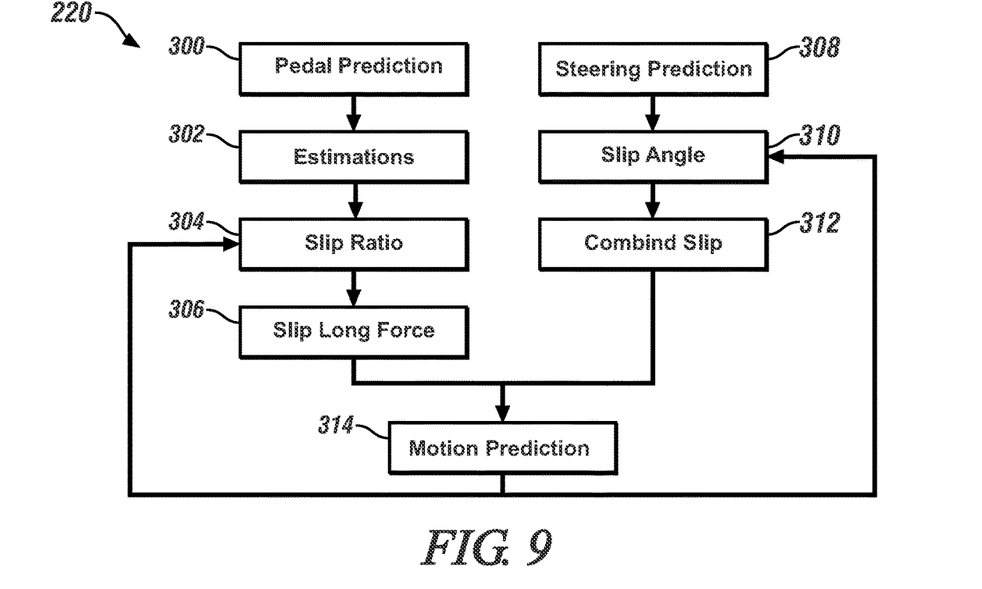
FIG. 9 is a flow diagram for a desired state calculation method in accordance with one or more exemplary embodiments.

Referring to FIG. 9, a flow diagram of an example implementation of the desired state calculation step 220 is shown in accordance with one or more exemplary embodiments. The step 220 includes steps 300 to step 314, as shown. The sequence of steps is shown as a representative example. Other step orders may be implemented to meet the criteria of a particular application.

In the step 300, predictions of the desired accelerator pedal and brake pedal positions are calculated. Estimations of driving torque, braking torque and wheel speeds at each corner of the vehicle 80 (e.g., at each tire) are calculated in the step 302. In the step 304, a slip ratio is predicted. A combined slip longitudinal force is predicted in the step 306.

In the step 308, steering predictions are calculated. A slip angle (e.g., a state of the vehicle) is predicted in the step 310. In the step 312, a combined slip lateral forces on the tires are calculated. In various embodiments, the steps 308 to 312 may be performed in parallel to the steps 300 to 306. In other embodiments, the steps 300 to 312 may be performed sequentially. In the step 314 a desired vehicle lateral motion and a desired longitudinal vehicle motion may be predicted based on body dynamics governing equations. To provide a more precise control action, the effect of driver command changes may be considered within the prediction horizon. If the driver commands change, the desired vehicle states are recalculated based on at least the predicted steering, throttle, and brake inputs.

The desired state calculations are based on the driver predicted commands. A predicted wheel speed ($I_w$) may be determined per equation 1 as follows:

$$I_w \omega_{t+k|t}^t = T_{t+k|t}^t - R_{eff_t} F_{x_{t+k-1|t}}^t, t = 1:4 \qquad \text{Eq. (1)}$$

where ω is a wheel rotational speed, T is a torque at a corner (wheel), $R_{eff}$ is an effective radius of a tire, and $F_x$ is a longitudinal force of the wheel.

A corner slip ratio (K) is defined by equation 2 as follows:

$$\kappa_{t+k|t}^t = \left(R_e \omega_{t+k|t}^t - v_{x_{t+k-1|t}}^t\right)/v_{x_{t+k-1|t}}^t \qquad \text{Eq. (2)}$$

where $v_x$ is a forward velocity and $R_e$ is the effective radius of the tire.

Lateral slip angles (α) may be defined by equation 3 as follows:

$$\alpha_{t+k|t}^t = \tan^{-1}\left(v_{x_{t+k-1|t}}^t / v_{y_{t+k-1|t}}^t\right) \qquad \text{Eq. (3)}$$

where $v_y$ is a lateral velocity.

Tire/road contact patch plane forces are calculated per equations 4 and 5 as follows:

$$F_{y_{t+k|t}}^t = F(\kappa_{t+k|t}^t, \alpha_{t+k|t}^t, \text{etc}), \qquad \text{Eq. (4)}$$

$$F_{x_{t+k|t}}^t = f(\kappa_{t+k|t}^t, \alpha_{t+k|t}^t, \text{etc}), \qquad \text{Eq. (5)}$$

Body dynamics governing equations 6-8 are provided as follows:

$$F_{y_{t+k|t}} = \sum_{i=1}^{q} \left(F_{x_{t+k|t}}^t \cos \delta_{t+k|t}^t - F_{y_{t+k|t}}^t \sin \delta_{t+k|t}^t\right) \qquad \text{Eq. (6)}$$

$$F_{y_{t+k|t}} = \sum_{i=1}^{q} \left(F_{y_{t+k|t}}^t \cos \delta_{t+k|t}^t + F_{x_{t+k|t}}^t \sin \delta_{t+k|k}^t\right) \qquad \text{Eq. (7)}$$

$$G_{z_{t+k|t}} = L_f \sum_{i=1,2} \left(F_{y_{t+k|t}}^t \cos \delta_{t+k|t}^t + F_{x_{t+k|t}}^t \sin \delta_{t+k|t}^t\right) - \qquad \text{Eq. (8)}$$
$$L_r \sum_{i=3,4} \left(F_{y_{t+k|t}}^t \cos \delta_{t+k|t}^t + F_{x_{t+k|t}}^t \sin \delta_{t+k|k}^t\right) +$$
$$L_{rr} \sum_{i=2,4} \left(F_{y_{t+k|t}}^t \cos \delta_{t+k|t}^t - F_{x_{t+k|t}}^t \sin \delta_{t+k|k}^t\right) -$$
$$L_{rr} \sum_{i=1,2} \left(F_{y_{t+k|t}}^t \cos \delta_{t+k|t}^t - F_{x_{t+k|t}}^t \sin \delta_{t+k|k}^t\right)$$

where $G_z$ is a moment around a z axis, $L_f$ is a distance of a front axle to a center of gravity, $L_r$ is a distance of a rear axle to the center of gravity, $L_w$ is a wheel track, and δ is a road wheel angle of the front axle.

Desired vehicle longitudinal and lateral states are defined by equations 9-11 as follows:

$$v_{x_{t+k|k}} = F_{x_{t+k|k}}/m - r_{t+k-1|t} \qquad \text{Eq. (9)}$$

$$v_{y_{t+k|k}} = F_{y_{t+k|k}}/m + v_{x_{t+k|k}} r_{t+k-1|t} \qquad \text{Eq. (10)}$$

$$r_{t+k|t} = G_{x_{t+k|k}}/I_z \qquad \text{Eq. (11)}$$

where r is the yaw rate and $I_z$ is a moment of inertia.

For predictive motion control, a goal may be set to minimize the error between the actual states ξ and the desired states $ξ_{des}$. Therefore, the following quadratic cost function $J_{MPC}$ may be defined over the finite time horizon as to achieve desired vehicle motion per equation 12 as follows:

$$J(U, x(t)) = \min_U \sum_{k=1}^{k=N_p} \|y_{t+k|t} - y_{des_{t+k|t}}\|_L^2 + \sum_{k=0}^{k=N_c-1} \|u_{t+k}\|_R^2 \quad \text{Eq. (12)}$$

subject to equations 13-16:

$$x_{t+k+1|t} = \overline{A} x_{t+k|t} + \overline{B} \mathcal{U}_{t+k|t} + \overline{W} \quad \text{Eq. (13)}$$

$$x_{t|t} = x(t) \quad \text{Eq. (14)}$$

$$y_{min} \leq y_{t+k|t} \leq y_{max} \quad \text{Eq. (15)}$$

$$\mathcal{U}_{min} \geq \mathcal{U}_{t+k} \mathcal{U}_{max} \quad \text{Eq. (16)}$$

where J is a cost function, U is a control action (or called control efforts), y represents outputs of the vehicle model, x represents states of the vehicle model, and A, B and W are matrices of the state space representation of the vehicle model.

In the driver command predictor 100, the desired vehicle motion is updated within the prediction horizon.

Figure 10:
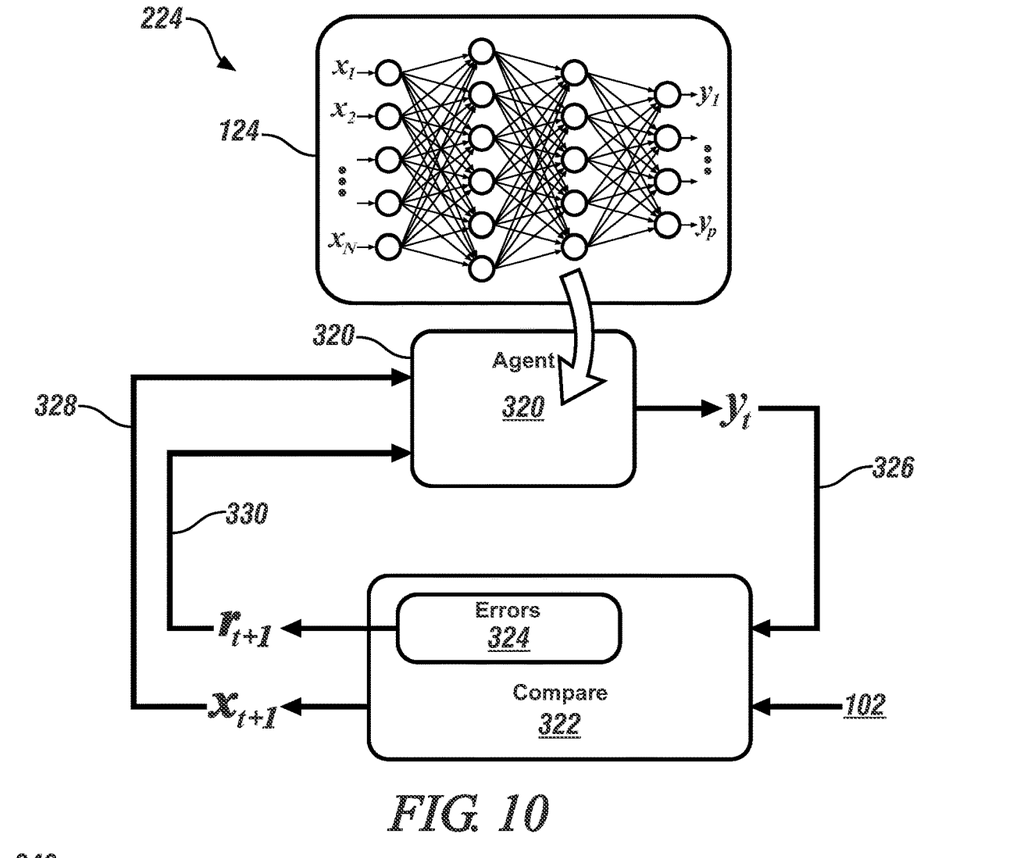
FIG. 10 is a flow diagram for a driver model adaptation method in accordance with one or more exemplary embodiments.

Referring to FIG. 10, a flow diagram of an example implementation of the driver model adaptation step 224 is shown in accordance with one or more exemplary embodiments. The step 224 includes steps 320 to 324, which are linked by predicted driver command 326, states 328, and rewards 330.

In the step 224, the predicted driver command signals 104 and the actual driver command signals 102 are compared. If the driver 84 reacts differently than as predicted (e.g., more than corresponding thresholds), a reinforcement learning (RL) mechanism may be initialized in real time to adapt and refine the driver model 124. The reinforcement learning mechanism learns the behavior of the driver 84 and customizes the driver model 124 for each vehicle 80/driver 84 for unseen behaviors. Outlier/poor driving behaviors may be discarded.

The driver model 124, acting as an agent in the step 320, generates the predicted driver commands 326. In the step 322, the predicted driver commands 326 are compared with the actual driver commands to determine the states 328. Prediction errors are generated as differences between the predicted driver commands 326 and the actual driver commands in the step 324. The prediction errors are presented back to the step 320 in the rewards 330. The step 320 subsequently adjusts the driver model 124 based on the states 328 and the rewards 330.

Figure 11:
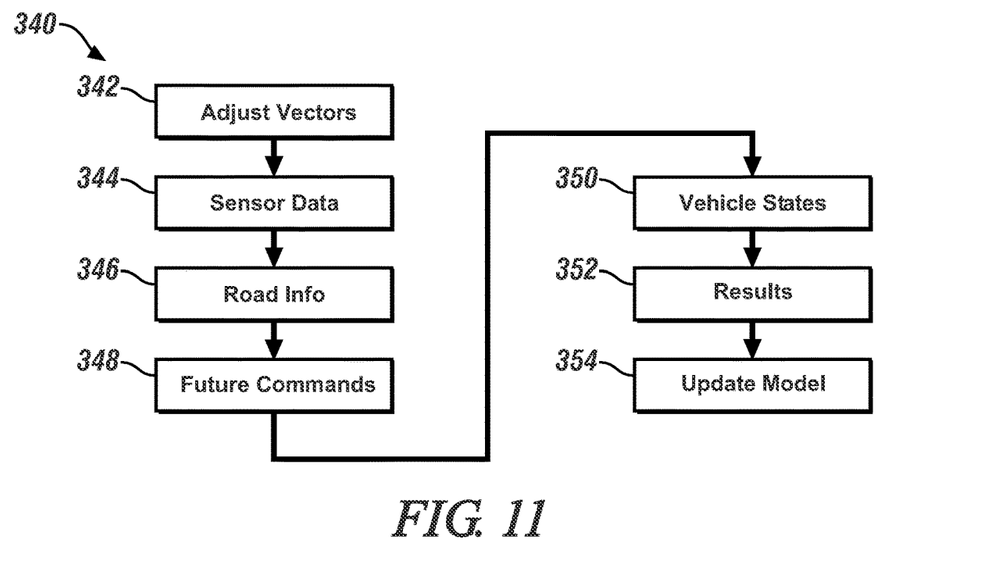
FIG. 11 is a flow diagram of a method for predicting driver commands in accordance with one or more exemplary embodiments.

Referring to FIG. 11, a flow diagram of an example implementation of a method 340 for predicting driver commands is shown in accordance with one or more exemplary embodiments. The method (or process) 340 is implemented in the driver command predictor 100. The method 340 includes steps 342 to 354, as shown. The sequence of steps is shown as a representative example. Other step orders may be implemented to meet the criteria of a particular application.

The step 342 involves commanding an adjustment of one or more motion vectors 92 of the vehicle 80 relative to a roadway 82 in response to the actual driver command signals 102 and the future driver command signals 134. The actual driver commands are received by the controller 110 at the current time K. The future driver commands are received by the controller 110 at the update times K to K+P. The update times range from the current time K to the future time K+P.

The step 344 generates the sensor data that determines the vehicle states 126 in response to the motion vectors 92 as commanded. The road information is generated in the step 346. The driver model 124 operates on the actual driver commands, the vehicle states 126, and the road information in the step 348 to generate the future driver commands at each update time K to K+P.

The step 350 involves generating desired states $\xi_{des}$ of the vehicle 80 based on the actual driver commands and the vehicle dynamic properties 90. The future driver commands are generated to conform the desired states $\xi_{des}$ to the actual states $\xi$. In the step 352, results are generated by a comparison of the future driver commands to the actual driver commands. The driver model 124 is updated in the step 354 based on the results generated in the step 352. The method 340 subsequently repeats to maintain the intended motion of the vehicle 80.

Figure 12:
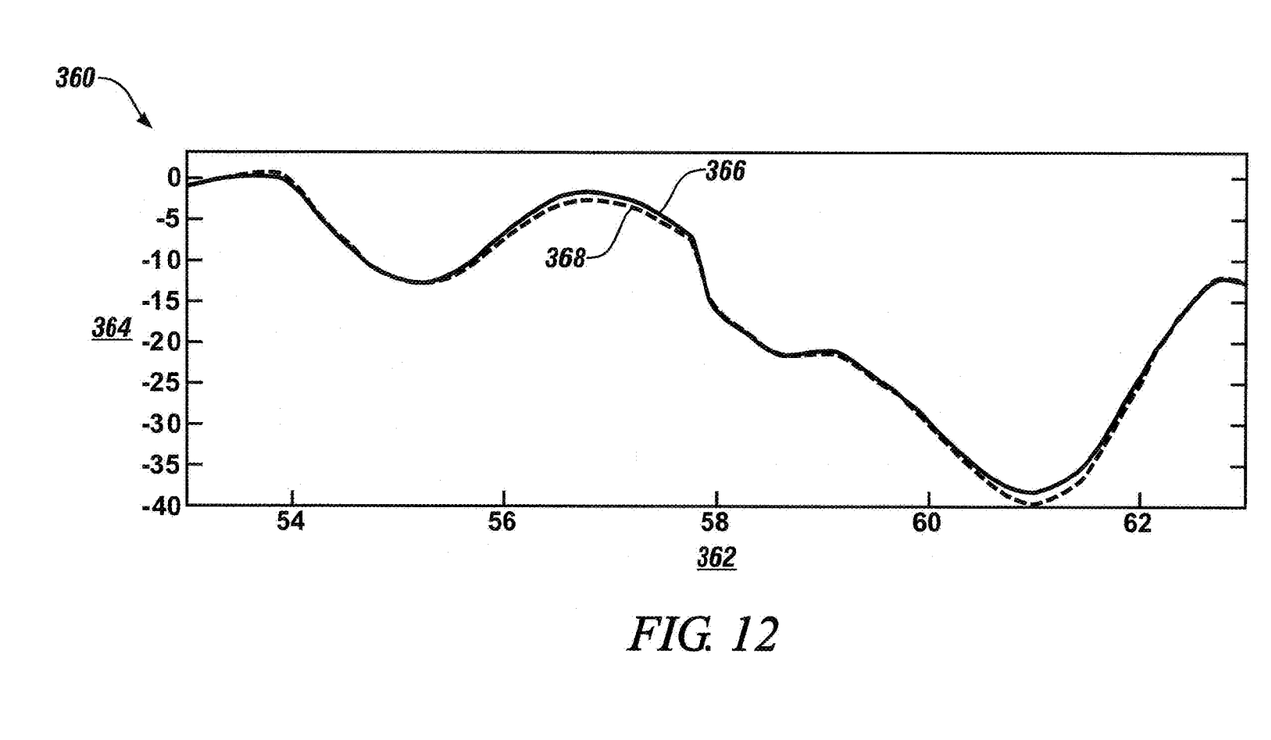
FIG. 12 is a graph of short-term steering wheel commands in accordance with one or more exemplary embodiments.

Referring to FIG. 12, a graph 360 of short-term steering wheel command predictions is shown in accordance with one or more exemplary embodiments. The graph 360 includes a first axis 362 and a second axis 364. The first axis 362 illustrates time in units of seconds. The second axis 364 illustrate a steering wheel angle in units of degrees.

The graph 360 illustrates a driving scenario where the vehicle 80 is traveling through a curvy roadway 82 with a variable speed target. A curve 366 shows the actual steering wheel angle commands as controlled by the driver 84. A curve 368 illustrates predicted steering wheel angle commands as calculated by the driver command predictor 100. Results of the driving scenario show that the predicted values for the steering wheel angle (curve 368) approximately match the actual values (curve 366) to within less than two degrees.

In limit handling (e.g., highly dynamic maneuvers, slippery road, etc.), the driver command predictor 100 supports the vehicle 80 to reach a maximum lateral grip by utilizing most of the tire capacity in the front axles and the rear axles. For this purpose, a desired lateral acceleration may be computed at each sampling time using the driver steering commands and the brake/throttle commands. The driver command predictor 100 predicts the driver short-term commands over a prediction horizon, and during each sampling time, according to current vehicle states and previous vehicle states, the actual driver commands, the road information, and the available sensory information on the target vehicle 80. Using the predicted driver commands, the driver command predictor 100 calculates control adjustment to achieve the accelerations requested by the driver 84, and in particular lateral acceleration, in such a way that the vehicle 80 reaches a maximum lateral grip while maintaining vehicle stability and lowering frequent counter-steering in severe limit handling driving scenarios.

In various embodiments, the driver command predictor 100 provides predictions of short-term driver commands for an enhancement of vehicle predictive motion control. The driver command predictor 100 includes the controller 110 that commands an adjustment of motion vectors 92 of a vehicle 80 relative to a roadway 82 in response to actual driver commands and future driver commands. The driver commands are received at a current time. The future driver commands are received at multiple update times that range from the current time to a future time. The future driver commands are used to calculate enhancements for automated vehicle motion predictive controls that provide more realistic navigation control than presumed constant driver decisions. The sensors 112 generate sensor data that determines multiple actual states of the vehicle 80 in response to the motion vectors 92. The prediction unit 114 is configured to generate the future driver commands at the update times in response to the driver model 124. The driver model 124 operates on the actual driver commands and the actual states to predict the future driver commands at the update times. The vehicle motion predictive controls are automatically reformulated to incorporate the predicted driver commands to achieve a desired lateral motion and yaw motion to support a maximum lateral grip of the vehicle.

All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A driver command predictor comprising:
   a controller configured to command an adjustment of one or more motion vectors of a vehicle relative to a roadway in response to a plurality of actual driver commands and a plurality of future driver commands, wherein the plurality of actual driver commands are received at a current time from a plurality of driver controls, the plurality of future driver commands are received at a plurality of update times, and the plurality of update times range from the current time to a future time;
   a plurality of sensors configured to generate a plurality of sensor data that determines a plurality of actual states of the vehicle in response to the one or more motion vectors as commanded;
   a memory device connected to the plurality of sensors to receive the plurality of sensor data and connected to the controller to present a plurality of vehicle states, wherein the memory device is configured to store the plurality of vehicle states derived from the plurality of sensor data; and
   a command prediction unit connected to the memory device to receive the plurality of vehicle states and connected to the controller to present a plurality of predicted driver commands, wherein the command prediction unit is configured to generate the plurality of future driver commands at the plurality of update times in response to a driver model and the plurality of vehicle states; and update the driver model while driving, wherein the driver model operates on the plurality of actual commands and the plurality of actual states to predict the plurality of future driver commands at the plurality of update times, and the driver model is a neural network model or a recursive model that estimates behavior of a driver.

2. The driver command predictor according to claim 1, further comprising:
   one or more information devices connected to the command prediction unit to present road information, wherein the one or more information devices are configured to generate the road information, and the driver model operates on the road information to generate the plurality of future driver commands at the plurality of update times.

3. The driver command predictor according to claim 1, wherein the driver model is a deep learning model.

4. The driver command predictor according to claim 3, wherein the deep learning model is configured to generate a plurality of desired states of the vehicle based on the plurality of actual driver commands and a plurality of vehicle dynamic properties.

5. The driver command predictor according to claim 4, wherein the command prediction unit generates the plurality of future driver commands to conform the plurality of desired states of the vehicle to the plurality of actual states of the vehicle.

6. The driver command predictor according to claim 1, wherein the command prediction unit is further configured to:
   generate a plurality of results by a comparison of the plurality of future driver commands to the plurality of actual driver commands; and
   update the driver model based on the plurality of results.

7. The driver command predictor according to claim 1, wherein the controller treats the plurality of actual driver commands as a plurality of constants between the current time and the future time.

8. The driver command predictor according to claim 1, wherein the controller comprises:
   a driver command interpreter connected to the plurality of driver controls to receive the plurality of actual driver commands and connected to the command prediction unit to receive the plurality of predicted driver commands, wherein the driver command interpreter is configured to generate a plurality of intermediate commands in response to the plurality of actual driver commands and the plurality of future driver commands; and
   a model predictive controller connected to the driver command interpreter to receive the plurality of intermediate commands and connected to the command prediction unit to receive the plurality of predicted driver commands, wherein the model predictive controller is configured to command the adjustment of the one or more motion vectors of the vehicle at the plurality of update times in response to the plurality of intermediate commands and the plurality of future driver commands.

9. The driver command predictor according to claim 1, wherein the future time is in a range of 100 milliseconds to 500 milliseconds after the current time.

10. A method for driver command prediction comprising:
    commanding, with a controller, an adjustment of one or more motion vectors of a vehicle relative to a roadway in response to a plurality of actual driver commands and a plurality of future driver commands, wherein the plurality of actual driver commands are received by the controller from a plurality of driver controls at a current time;

generating, with a plurality of sensors, a plurality of sensor data that determines a plurality of actual states of the vehicle in response to the one or more motion vectors as commanded;

storing, in a memory device, a plurality of vehicle states derived from the plurality of sensor data, wherein the memory device is connected to the plurality of sensors to receive the plurality of sensor data and connected to the controller to present the plurality of vehicle states;

generating, with a command prediction unit, the plurality of future driver commands at a plurality of update times in response to a driver model and the plurality of vehicle states, wherein the plurality of update times range from the current time to a future time, the driver model operates on the plurality of actual driver commands and the plurality of actual states to predict the plurality of future driver commands at the plurality of update times, the driver model is a neural network model or a recursive model that estimates behavior of a driver, and the command prediction unit is connected to the memory device to receive the plurality of vehicle states and connected to the controller to present a plurality of predicted driver commands; and updating, with the command prediction unit, the driver model while driving.

11. The method according to claim 10, further comprising:

generating, with one or more information devices, road information, wherein the one or more information devices are connected to the command prediction unit to present the road information, and the driver model operates on the road information to generate the plurality of future driver commands at the plurality of update times.

12. The method according to claim 10, wherein the driver model is a deep learning model.

13. The method according to claim 12, wherein the deep learning model is configured to generate a plurality of desired states of the vehicle based on the plurality of actual driver commands and a plurality of vehicle dynamic properties.

14. The method according to claim 13, wherein the plurality of future driver commands are generated to conform the plurality of desired states of the vehicle to the plurality of actual states of the vehicle.

15. The method according to claim 10, further comprising:

generating, with the command prediction unit, a plurality of results by a comparison of the plurality of future driver commands to the plurality of actual driver commands; and updating the driver model based on the plurality of results.

16. The method according to claim 10, wherein the plurality of actual driver commands are treated as a plurality of constants between the current time and the future time.

17. A vehicle comprising:

a plurality of driver controls configured to generate a plurality of actual driver commands; and a driver command predictor connected to the plurality of driver controls, wherein the driver command predictor is configured to:

command, with a controller, an adjustment of one or more motion vectors of the vehicle relative to a roadway in response to the plurality of actual driver commands and a plurality of future driver commands, wherein the plurality of actual driver commands are received at a current time, and the controller is connected to the plurality of driver controls;

generate, with a plurality of sensors, a plurality of sensor data that determines a plurality of actual states of the vehicle in response to the one or more motion vectors as commanded;

store, in a memory device, a plurality of vehicle states derived from the plurality of sensor data, wherein the memory device is connected to the plurality of sensors and connected to the controller; and generate, with a command prediction unit, the plurality of future driver commands at a plurality of update times in response to a driver model and the plurality of vehicle states, wherein the plurality of update times range from the current time to a future time, the driver model operates on the plurality of actual driver commands and the plurality of actual states to predict the plurality of future driver commands at the plurality of update times, the driver model is a neural network model or a recursive model that estimates behavior of a driver, and the command prediction unit is connected to the plurality of driver controls, connected to the memory device, and connected to the controller; and updating, with a command prediction unit, the driver model while driving.

18. The vehicle according to claim 17, wherein the driver command predictor further comprises:

one or more information devices configured to generate road information, wherein the driver model operates on the road information to generate the plurality of future driver commands at the plurality of update times, and the one or more information devices are connected to the command prediction unit.

19. The vehicle according to claim 18, wherein:

the driver model is a deep learning model; and the deep learning model is configured to generate a plurality of desired states of the vehicle based on the plurality of actual driver commands and a plurality of vehicle dynamic properties.

20. The vehicle according to claim 19, wherein the driver command predictor generates the plurality of future driver commands to conform the plurality of desired states to the plurality of actual states.

* * * * *